United States Patent [19]
Fujioka et al.

[11] Patent Number: 5,765,365
[45] Date of Patent: Jun. 16, 1998

[54] COAL GASIFICATION POWER GENERATOR

[75] Inventors: Yuichi Fujioka; Kimishiro Tokuda; Toshimitsu Ichinose; Yoshihiko Tsuchiyama, all of Nagasaki-ken; Fumiya Nakashima, Tokyo; Shigeyasu Ishigami, Tokyo; Satoshi Uchida. Tokyo, all of Japan

[73] Assignee: Mitsubishi Jukogyo Kabushiki Kaisha. Tokyo, Japan

[21] Appl. No.: 594,407

[22] Filed: Jan. 31, 1996

Related U.S. Application Data

[63] Continuation-in-part of Ser. No. 375,520, Jan. 18, 1995, Pat. No. 5,517,815, which is a continuation of Ser. No. 209,469, Mar. 14, 1994, abandoned.

[30] Foreign Application Priority Data

Mar. 15, 1993 [JP] Japan ............... 5-53827
Jan. 13, 1994 [JP] Japan ............... 6-1999

[51] Int. Cl.$^6$ ............... F02C 3/28
[52] U.S. Cl. ............... 60/39.12
[58] Field of Search ............... 60/39.02, 39.12, 60/39.182; 95/135, 136, 235; 110/344, 345

[56] References Cited

U.S. PATENT DOCUMENTS

| | | | |
|---|---|---|---|
| 2,671,722 | 3/1954 | Sweetser et al. | 95/135 |
| 3,481,834 | 12/1969 | Squires | 60/39.182 |
| 3,804,606 | 4/1974 | Archer et al. | 60/39.12 |
| 3,847,563 | 11/1974 | Archer et al. | 48/77 |
| 3,986,348 | 10/1976 | Switzer | 60/39.12 |
| 4,815,418 | 3/1989 | Maeda et al. | |
| 5,517,815 | 5/1996 | Fujioka et al. | 60/39.12 |

FOREIGN PATENT DOCUMENTS 36 42 619  6/1988  Germany.

OTHER PUBLICATIONS

Patent Abstracts of Japan, vol. 8, No. 20 (M-271) (1457), Jan. 27, 1984.

*Primary Examiner*—Louis J. Casaregola
*Attorney, Agent, or Firm*—Wenderoth, Lind & Ponack

[57] ABSTRACT

In a coal gasification power generator, coal gas 500 obtained by gasifying a coal 100 by a gasifying furnace is introduced into a desulfurization furnace in which the coal gas 500 is desulfurized by limestone 400. A coal gas 501 after desulfurization is burned by a combuster 5 after it has passed through a dust removing unit 3 so that high temperature combustion gas 800 is supplied to a gas turbine. The gas turbine 7 drives a power generating unit. Exhaust gas 801 from the gas turbine is supplied to an exhaust gas boiler 8. Char 60a produced in the gasifying furnace and limestone 60b containing CaS emitted from the desulfurization furnace are burned in an oxidation furnace, and by using the resultant combustion gas, water vapor introduced from the exhaust gas boiler 8 is heated by a heat exchanger, and thereafter it is supplied to the gasifying furnace as a gas. With the above construction, chemical energy possessed by the coal is effectively converted into electric energy, and also the rate of desulfurization of coal gasifying gas is improved thereby reducing emitted sulfur oxide.

2 Claims, 7 Drawing Sheets

FIG. 2

EACH PORTION PROPERTY QUANTITY

| NO | PROPERTY | 100 | 400 | 900 | 500 | 501 | 502 | 700 | 202 | 204 |
|---|---|---|---|---|---|---|---|---|---|---|
| | | COAL | LIME-STONE | ASHES | COAL GAS | ↑ | ↑ | OXIDA-TION GAS | AIR | ↑ |
| WEIGHT | kg/h | 89,600 | 2,300 | 10,700 | 471,500 | 472,400 | ↑ | 180,700 | 219,300 | 153,300 |
| TEMPER-ATURE | °C | 15 | 15 | 870 | 950 | 935 | 450 | 870 | 390 | 390 |
| PRESSURE | ata | 1 | 1 | 1 | 21 | 20 | 19 | 22 | 22 | 23 |

| NO | PROPERTY | 201 | 801 | 802 | 300 |
|---|---|---|---|---|---|
| | | ↑ | EXHAUST GAS | ↑ | WATER VAPOR |
| WEIGHT | kg/h | 372,600 | 2308,000 | ↑ | 17,900 |
| TEMPER-ATURE | °C | 390 | 550 | 140 | 380 |
| PRESSURE | ata | 14 | 1.1 | 1.0 | 40 |

PRIMARY GAS PROPERTY

| PROPERTY | NO | H₂ | CO₂ | CH₄ | CO | H₂O | N₂ | O₂ |
|---|---|---|---|---|---|---|---|---|
| COAL GAS | 502 | 12.3 | 4.4 | 0.8 | 24.6 | 3.3 | 54.5 | 0 |
| COMBUSTION FURNACE GAS | 700 | 0 | 13.4 | 0 | 0 | 15.8 | 66.8 | 4.0 |
| HRSG EXHAUST GAS | 802 | 0 | 8.9 | 0 | 0 | 5.2 | 76.1 | 9.8 |

G/T OUTPUT  192000 .kW
S/T OUTPUT  168000 .kW
POWER GENERATION
 TERMINAL OUTPUT  360000 .kW
POWER TRANSMISSION
 TERMINAL OUTPUT  334900 .kW
POWER GENERATION
 TERMINAL EFFICIENCY  47.0 (%HHV)
POWER TRANSMISSION
 TERMINAL EFFICIENCY  43.5 (%HHV)

COAL GASIFICATION POWER GENERATOR

This application is a Continuation-In-Part of prior U.S. patent application Ser. No. 08/375,520, filed Jan. 18, 1995, U.S. Pat. No. 5,517,815 which is a Continuation of U.S. patent application Ser. No. 08/209,469, filed Mar. 14, 1994 and now abandoned.

BACKGROUND OF THE INVENTION

1. Field of the Invention

The present invention relates to an apparatus for generating power by use of a gaseous fuel such as gasified coal.

2. Discussion of the Related Art

Coal is of importance as a fuel for power generation now and in the future since there are a lot of coal reserves, and the coal reserves are hardly unevenly distributed over the world. It is required to reduce the emission of the materials such as SOx, NOx, or $CO_2$ from a power plant which generates power by using coal as a fuel, which adversely affect the global environment, and also to improve the efficiency of power a coal gasification generation. To satisfy such requirements, a coal gasification power generator, a power generator of the pressurized fluidized bed combustion boiler type and the like have been developed in lieu of a conventional pulverized coal boiler. As one of those developing power generators, there has been proposed a power generator using a fluidized bed coal gasifying furnace. One example of the conventional power generator is shown in FIG. 6. This conventional power generator has been proposed by British Coal Corporation in Great Britain, and will be described with reference to FIG. 6.

Coal 100, limestone 400, air 203 and water vapor 300 are supplied to a coal gasifying furnace 1'. The coal 100 is gasified in the coal gasifying furnace 1'. $H_2S$ and COS in the resultant generated gas are reacted with the limestone 400 and fixed as CaS in the limestone 400.

Dust in a coal gas 500 generated from the coal gasifying furnace 1' is removed by a dust removing unit 3. A coal gas 501 which has been subjected to dust removal is introduced in a combuster 5. Char which has not been gasified in the coal gasifying furnace 1' and particles 60b of the limestone 400 after the above reaction are extracted from the coal gasifying furnace 1' and then transferred to a hopper 17. Particles 60c removed from the coal gas 500 by the dust removing unit are transferred to the hopper 17.

Air 200 is pressurized by an air compressor 6 to produce a pressurized air 201. Pressurized air 204, which is a part of the pressurized air 201, is supplied to the combuster 5. The gas 501 is burned by the combuster 5 by application of the pressurized air 204, thereby generating a gas turbine inlet gas 800. A gas turbine 7 is driven by the gas turbine inlet gas 800 to produce a gas turbine outlet gas 801 having normal pressure. The gas turbine 7 drives the air compressor 6 and the power generator whereby electricity is obtained from the power generator. The heat of the gas turbine outlet gas 801 is retrieved by an exhaust heat recovery boiler 8a to be radiated to the air from a funnel.

The char and particles 60d of a desulfurization agent stored in the hopper 17 are supplied to an atmospheric circulating fluidized bed combustion unit 2'. In the atmospheric circulating fluidized bed combustion unit 2', the char is burned by the aid of air 206 supplied from a blower 18 while CaS contained in the limestone 400 is oxidized into $CASO_4$. After the heat of a combustion gas 700 produced from the atmospheric circulating fluidized bed combustion unit 2' is retrieved by an exhaust heat recovery boiler 8b, particles 901 contained in a combustion gas 701 is removed by a dust removing unit 19 so that the gas 700 are radiated to the air from the funnel 9 as a gas 803.

Water vapor 30a which has been heated by heat exchangers 10a and 10b installed in the exhaust heat recovery boilers 8a and 8b and a heat exchanger 10c installed in the atmospheric circulating fluidized bed combustion unit 2' drives a steam turbine 11 which drives the power generator. As a result, electricity is produced from the power generator.

The above-mentioned conventional power generator has a first problem in that the efficiency of power generation is low. Among chemical energy possessed by coal, chemical energy possessed by the char, which has been transferred to the atmospheric circulating fluidized bed combustion unit 2' without being gasified in the coal gasifying furnace 1', is transformed into electrical energy by the steam turbine 11. However, the energy possessed by the char is not used for driving the gas turbine 7. Therefore, there is a disadvantage in that the conversion efficiency of chemical energy into electrical energy is lowered for the condition where the gas turbine 7 is not used.

The conventional power generator has a second problem that lowers the efficiency of desulfurization. The first reason why the efficiency of desulfurization is lowered is that the efficiency of desulfurization of the coal gasifying furnace 1' is lowered. The second reason why the efficiency of desulfurization is that a large amount of $SO_2$ is emitted from the atmospheric circulating fluidized bed combustion unit 2'.

As described above, in the conventional power generator, limestone and coal are supplied to the coal gasifying furnace 1' so that gasification of coal and desulfurization of $H_2S$ and COS contained in the gas due to limestone are carried out in the same fluidized bed. In this case, it has been recognized that the rate of desulfurization in the coal gasifying furnace 1' is lowered for three causes stated below.

The first cause is that, in an area where oxygen exists at the bottom of the coal gasifying furnace 1', limestone is reacted with $H_2S$ and COS contained in the gas to produce CaS which is reacted with oxygen. As a result, there occurs a reaction in which CaS is converted into CaO and $SO_2$.

The second cause is that a time required for completing desulfurization is different from that of gasification of coal. In order to complete desulfurization due to the existence of limestone, for example, approximately 120 seconds are required in a gas at 900° C. under the pressure of 12 ata. On the contrary, a time required for gasification of coal is approximately 30 minutes. Therefore, provided that a time necessary for gasification of coal is a particle residence time of coal and limestone in the coal gasifying furnace 1', there is no time sufficient for completion of the desulfurization reaction.

The third cause is that, because $H_2S$ and CO are produced in the whole furnace due to gasification of coal, $H_2S$ and COS produced in the upper portion of the furnace have a shorter time to be in contact with limestone in the furnace compared with $H_2S$ and COS generated at the lower portion of the furnace.

For the above-mentioned reasons, the desulfurization efficiency of coal and limestone in the coal gasifying furnace 1' could not be elevated.

SUMMARY OF THE INVENTION

An object of the present invention is to provide a coal gasification power generator which is capable of improving the efficiency of power generation by efficiently converting chemical energy into electrical energy.

Another object of the present invention is to provide a coal gasification power generator which is capable of reducing sulfur oxide to be emitted by improving the rate of desulfurization to coal gas used as fuel.

In the coal gasification power generator in accordance with the present invention, the following structure is applied for achieving an improvement in the efficiency of power generation and an improvement in the efficiency of desulfurization.

(1) Improvement in the efficiency of power generation

According to the present invention, in order to elevate the efficiency of power generation in a power generator, the following system is used for efficiently distributing coal energy to a gas turbine and a steam turbine.

First, combustion gas generated from an oxidizing furnace which allows char generated in a gasifying furnace to be burned is introduced as a gasifying agent in a gasifying furnace. Then, coal gas supplied from the gasifying furnace is used for driving a gas turbine.

Thus, coal char is burned in the oxidizing furnace, and the combustion gas is used as a gasification agent in the gasifying furnace whereby coal char energy is converted into coal gas energy. The coal gas is used for driving the gas turbine. As a result, coal char energy can be used for gas turbine drive.

Further, according to the present invention, a heat exchanger to heat water vapor is located in a bed of an oxidizing furnace for cooling. This is a system to supply water vapor after overheating water vapor from an exhaust heat recovery boiler to the steam turbine.

To the heat exchanger thus configured for cooling the bed of the oxidizing furnace, water vapor is supplied, and then water vapor whose temperature is increased up in the heat exchanger is used in the steam turbine. As a result, the quantity of water vapor is increased and the temperature of water vapor supplied to the steam turbine is elevated in comparison with the conventional system. Consequently, the quantity of heat exchange with oxidizing furnace emission gas is increased and the efficiency of the steam turbine due to the temperature rise in the water vapor is heightened, and loss of the emission gas caused by making the funnel inlet temperature of the emission gas boiler lowered can be reduced.

(2) An improvement in the efficiency of desulfurization

The present invention has the following structure in order to improve the efficiency of desulfurization.

First, a coal gasifying section and a desulfurizing section are divided into a gasifying furnace and a desulfurization furnace, respectively. A coal gas produced by the gasifying furnace is introduced into the desulfurization furnace, and limestone supply equipment is installed in the desulfurization furnace. A fluidized bed is formed in the desulfurization furnace, which is constituted as a reactor which can adjust the height of the fluidized bed.

Thus, the gasifying furnace and the desulfurization furnace are separated to prevent CaS from being converted due to oxygen, which is the first cause of lowering of the desulfurization efficiency.

Further, with the separation of the gasifying furnace and the desulfurization furnace, the adverse condition of the residence time of limestone within the furnace be shorter than a reaction time necessary for the conversion of limestone into CaS in the conventional system, which is the second cause of lowering the desulfurization efficiency, can be improved. The intended residence time of limestone for completion of the reaction in which limestone is converted into CaS can be ensured by adjusting the height of the fluidized bed.

By separating the gasifying furnace and the desulfurization furnace, the efficiency of contact of $H_2S$ and COS in the coal gas and limestone, which is the third cause of lowering of the desulfurization efficiency, is improved. The sum of $H_2S$ in the coal gas and the density of COS becomes maximum at the gasifying furnace outlet, and the coal gas is supplied to the desulfurization furnace with a maximum of $H_2S$ and the COS density to improve the efficiency of contact of $H_2S$ with COS.

In addition, according to the present invention, the desulfurization furnace has the following structure with the result that the efficiency of desulfurization can be improved more than the above cases.

That is, a gas dispersion plate for forming the fluidized bed of limestone is installed within a reactor of the desulfurization furnace, and an interior dispersion plate, which is formed of a porous plate for limiting the movement of particles, is installed within the fluidized bed. The fluidized bed is divided into upper and lower fluidized beds by the interior dispersion plate. A cooler (heat exchanger) is located on the upper fluidized bed, and limestone is supplied to the upper fluidized bed. Coal gas is supplied from piping, which is coupled with the gasifying furnace, to the lower fluidized bed through the gas dispersion plate, and the coal gas which has passed through the lower fluidized bed is supplied through the interior dispersion plate to the upper fluidized layer. The coal gas which has passed the upper fluidized bed is sent out to piping coupled with a dust removing unit. The temperature of the upper fluidized bed is regulated by the cooler (heat exchanger) to 800° to 950° C. The temperature of the lower fluidized layer is regulated to 900 to 1100° C.

Thus, the desulfurization furnace is divided into the upper and lower fluidized beds, limestone is supplied to the upper fluidized bed, and the temperature of the upper fluidized bed is regulated to 800° to 950° C., whereby non-reactive limestone is reacted with $H_2S$ and COS in the vicinity of the surface of limestone particles so that $H_2S$ and COS in gas are fixed to the surface of limestone. The limestone particles whose surface has been changed into CaS is moved to the lower fluidized bed, and then the temperature of the fluidized bed becomes 950° to 1100° C., whereby there occurs such a reaction that $CaCO_3$ contained in limestone is converted to CaO and $CO_2$. Thereafter, the reaction effective area of limestone is increased when $CO_2$ is released from the interior of the limestone particles, as the result of which $H_2S$ and COS are fixed to the interior of limestone as CaS.

Setting the temperature of the lower fluidized bed to 900° to 1100° C. enables the reaction speed at which $CACO_3$ is converted into CaO and $CO_2$ to be substantially equal to the speed of desulfurization reaction so that CaS production weight per limestone weight can be increased. Since the above-mentioned reaction speed necessary for converting $CaCO_3$ to CaO and $CO_2$ is affected by the divided pressure of $CO_2$, the reaction speed necessary for converting $CaCO_3$ to CaO and $CO_2$ can be adjusted depending on the temperature.

Although the densities of $H_2S$ and COS in the coal gas in the lower fluidized bed are lowered, the density of $H_2S$ in the reaction equilibrium gas is increased from the reaction equilibrium of limestone and $H_2S$ as the temperature goes up, as shown in FIG. 5. After the density of $H_2S$ approaches to a value of the H₂S density in the gas of the lower fluidized bed, it is reacted with limestone which is not reactive in the upper fluidized bed at a temperature lower than that of the lower fluidized bed to further reduce the density of H₂S.

BRIEF DESCRIPTION OF THE DRAWINGS

Other objects, advantages and features of the invention will be apparent when carefully reading the following detailed description in connection with the accompanying drawings, in which:

FIG. 2 is a table showing the temperature of a main unit, a mass balance and gas components in accordance with the first embodiment;

DETAILED DESCRIPTION OF THE PREFERRED EMBODIMENTS

Figure 1:
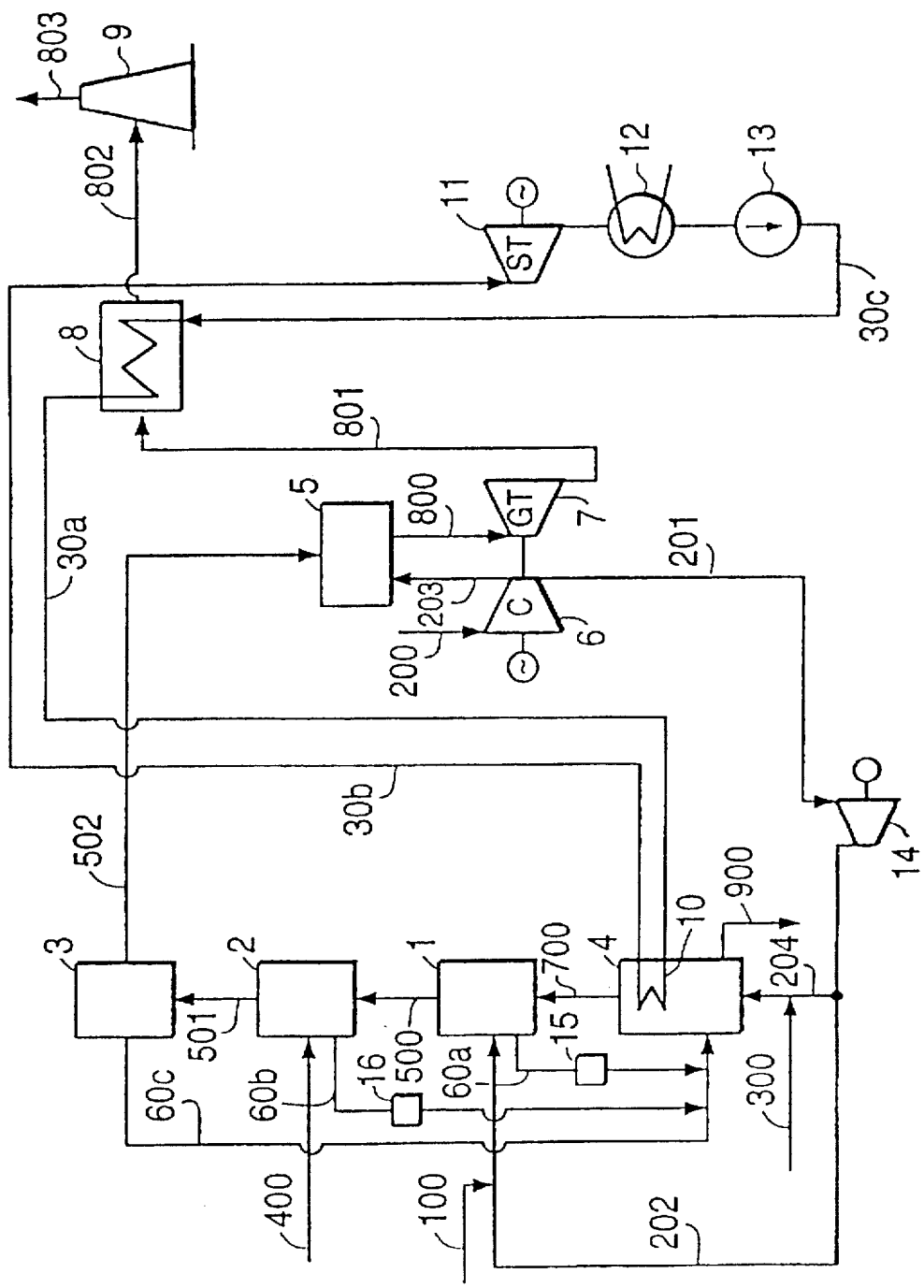
FIG. 1 is a system diagram of a first embodiment of a coal gasification power generator in accordance with the present invention.

FIG. 1 shows a first embodiment in accordance with the present invention. The first embodiment will be described with reference to FIG. 1. In the first embodiment, air is used as oxidation gas.

Coal 100 and pressurized air 202 are supplied to a gasifying furnace 1. In the gasifying furnace 1, the coal 100 is gasified by the aid of oxygen in the pressurized air 202 and a combustion gas 700 in an oxidizing furnace 4, thereby being converted into a coal gas 500 and char 60a.

The coal gas 500 is transferred to a desulfurization furnace 2 to which limestone 400 is supplied. In the desulfurization furnace 2, a fluidized bed of the limestone 400 is formed, and the coal gas 500 plays the role of fluidized gas in the fluidized bed. The limestone 400 is reacted with H₂S and COS in the coal gas 500 in such a manner that a part of the limestone 400 is converted into CaS.

After desulfurization, a coal gas 501 is transferred to a dust removing unit 3 by which particles contained in the coal gas 501 are removed. A purpose of removing the particles by means of the dust removing unit 3 is to prevent those particles from wearing a gas turbine blade of a gas turbine 7 and also from being attached to the gas turbine blade.

After desulfurization, a coal gas 502 is sent to a combuster 5. In the combuster 5, the coal gas 502 is burned with pressurized air 203 to produce a combustion gas 800.

The combustion gas 800 is transmitted to the gas turbine 7 which is driven by the combustion gas 800 so that it drives an air compressor 6 and a power generator from which electricity is generated.

A combustion gas 801 in a gas turbine outlet allows a water vapor 30a to be generated by the aid of the high heat of the combustion gas 801 in an emission gas boiler 8. A combustion gas 802, whose temperature is lowered because it is restored by the emission gas boiler 8, is radiated as a combustion gas 803 from a funnel 9 toward the atmosphere.

The char 60a formed in the gasifying furnace 1 is supplied to an oxidizing furnace 4 through a char transfer unit 15. Limestone 60b containing CaS formed by the desulfurization furnace 1 is supplied to the oxidizing furnace 4 through a desulfurization transfer unit 16. In the oxidizing furnace 4, particles 60c which have been removed from gas 501 by the dust removing unit 3, the char 60a and CaS contained in the desulfurization agent 60b are burned with oxygen contained in pressurized air 204 so that the CaS of the desulfurization agent 60b is oxidized into CaSO₄. The heat generated in the oxidizing furnace 4 is used to produce water vapor 30b by a heat exchanger 10. The combustion gas 700 is supplied to the gasifying furnace 1 so as to be used as a gasifying agent.

The water vapor 30a which has received heat from the combustion gas 801 by means of the emission gas boiler 8 further receives oxidation reaction heat of char, thereby forming the water vapor 30b which drives a steam turbine 11. The steam turbine 11 drives the power generator which generates electricity. Water vapor which has driven the steam turbine 11 is cooled by a steam condenser 12 into water 30c to be pressurized by a pressure pump 13 and then transferred to the emission gas boiler 8.

The air compressor 6 takes in air 200 and compresses it to produce pressurized air. The pressurized air is distributed to the pressurized air 203 supplied to the combuster 5 and a pressurized air 201 supplied to a gas booster 14. The pressurized air which has been boosted by the gas booster 14 is distributed to the pressurized air 202 supplied to the gasifying furnace 1 and the pressurized air 204 supplied to the oxidizing furnace.

Ashes in coal and limestone after desulfurization are emitted as emission ashes 900 from the oxidizing furnace 4 toward the exterior of this power generator.

A mass balance, temperature and gas components in the major units of the system according to the above-mentioned embodiment of FIG. 1 are shown in FIG. 2.

Figure 3:
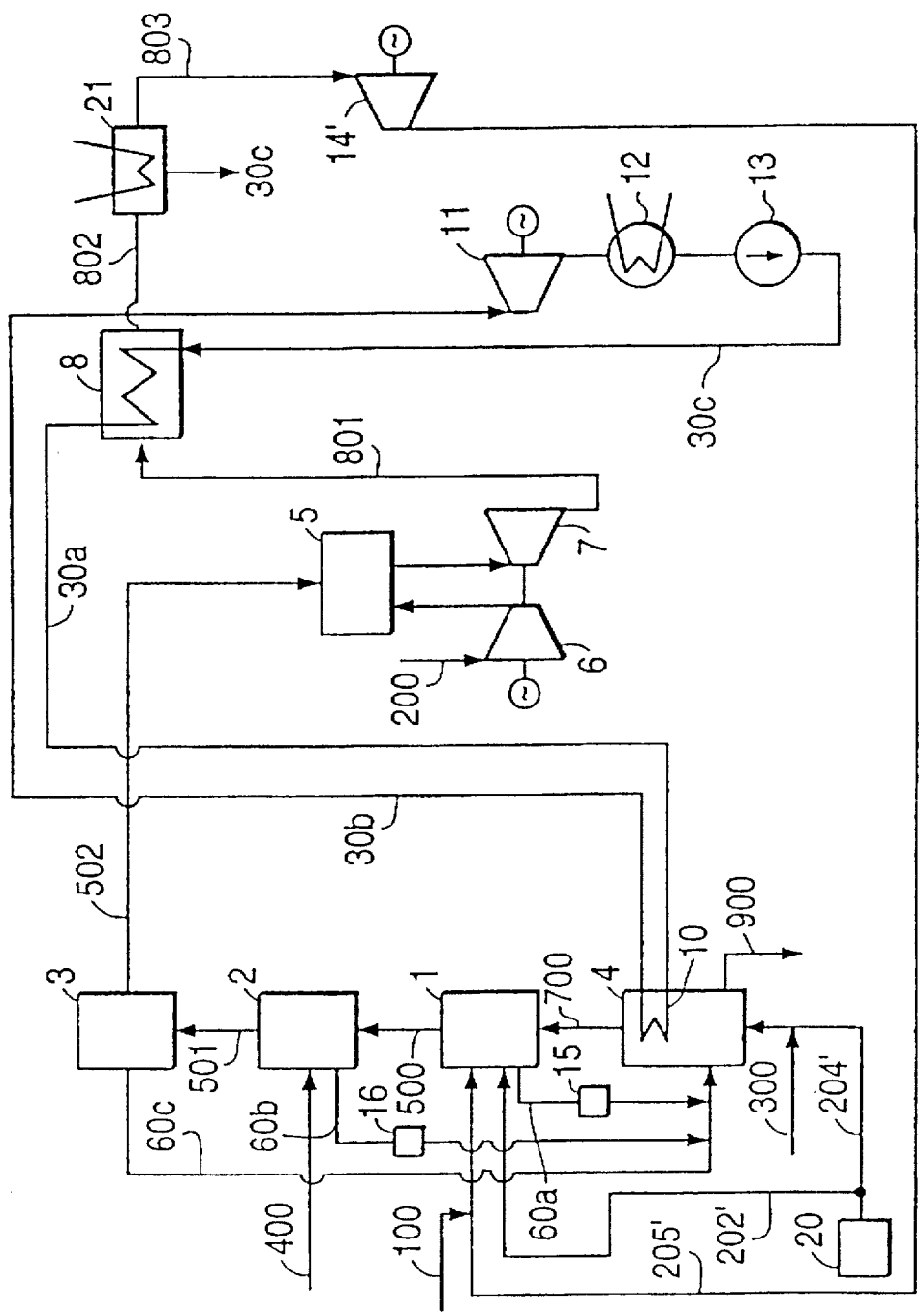
FIG. 3 is a system diagram of a second embodiment of coal gasification power generator in accordance with the present invention.

FIG. 3 shows a coal gasification power generator in accordance with a second embodiment of the invention, which is a case of using oxidation gas oxygen. Differences from FIG. 1 will be described with reference to FIG. 3.

Oxygen gas from an oxygen manufacturing plant 20 is used for an oxidizing furnace oxidation gas 204' and a gasifying furnace oxidation gas 205'. After the combustion gas 802 containing a large amount of CO₂ is cooled and dehydrated by a combustion gas cooler 21, a resultant gas 803 is compressed by the gas booster 14' and then introduced into the gasifying furnace 1 so that it is introduced as a gasifying agent 205' at coal gasification.

Figure 4:
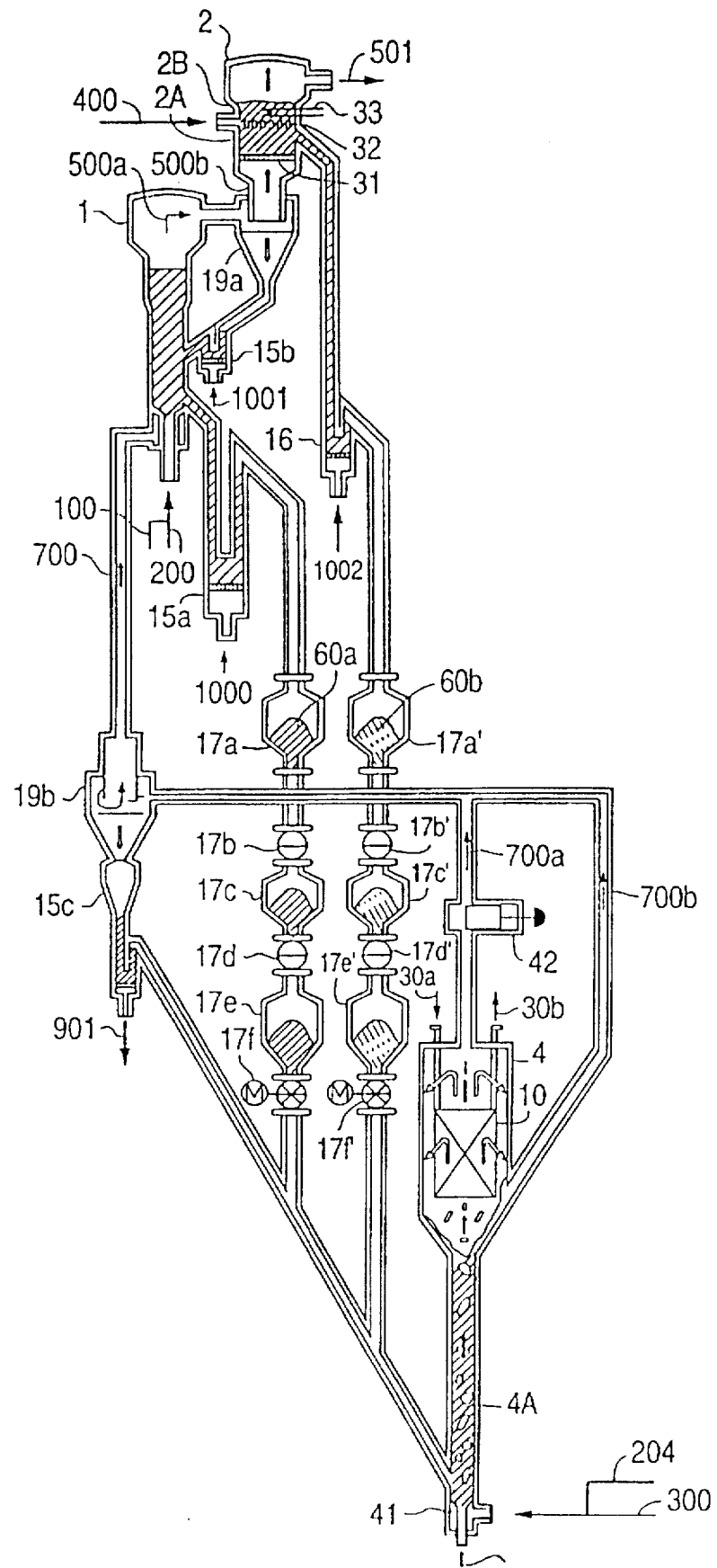
FIG. 4 is a conceptual diagram showing the structure of a gasifying furnace, a desulfurization furnace, and an oxidizing furnace of the first embodiment of the coal gasification power generator.

FIG. 4 shows one example of the gasifying furnace 1, a desulfurization furnace 2 and an oxidizing furnace 4 in accordance with the present invention. FIG. 4 will be briefly explained in the following. The coal 100 and the pressurized air 200 are supplied to the gasifying furnace 1. In the gasifying furnace 1, the coal 100 is gasified by the aid of oxygen in the pressurized air 200 and the combustion gas 700 in the oxidizing furnace 4 so as to be converted to a coal gas 500a and the char 60a.

A char transfer unit 15a is supplied with an inert gas 1000 through piping. When the inert gas 1000 is supplied intermittently to the char transfer unit 15a, the particles within the piping are fluidized. When the inert gas 1000 is not supplied thereto, the char transfer unit 15a forms a fixed bed.

When the particles are fluidized, they are transferred from the gasifying furnace 1 to a hopper 17a. The char 60a has an emission quantity which is controlled by a supply quantity of the inert gas 1000 and its supply intermittent time so that the quantity of the char 60a extracted to the hopper 17a is controlled. The dust of the coal gas 500a is removed by a cyclone 19a. The particles whose dust has been removed by the cyclone 19a are recycled through the char transfer unit 15b from the lower portion of the cyclone 19a within the gasifying furnace 1 by the aid of an inert gas 1001. The coal gas 500b after being subjected to dust removal treatment is supplied to the desulfurization furnace 2 through a dispersion plate 31.

In the desulfurization furnace 2, a fluidized bed of limestone 400 is formed, and the coal gas 500b plays the role of fluidized gas in the fluidized bed. The desulfurization furnace 2 is divided by an interior dispersion plate 32 into an upper fluidized bed 2B and a lower fluidized bed 2A. The limestone 400 is supplied to the upper fluidized bed 2B. The interior dispersion plate 32 reduces the sectional area of the fluidized bed by 50% or less so that a mixing of the particles between the upper fluidized bed 2B and the lower fluidized bed 2A is limited. In the upper fluidized bed 2B, a cooler (heat exchanger) 33 is installed. The cooler 33 cools the particles and gas, and controls the mixing quantity of the particles in the upper fluidized bed 2B and the particles in the lower fluidized bed 2A so that the temperature of the upper fluidized bed 2B is maintained at 800° to 900° C. and the temperature of the lower fluidized bed 2A is maintained to 950° C. The limestone 400 is reacted with $H_2S$ and COS contained in the coal gas 500b whereby a part of the limestone 400 is changed into CaS. The coal gas 501 after desulfurization is transferred to a dust removing unit (not shown).

A desulfurization agent 60b is extracted from the desulfurization furnace 2 while the extracted quantity of the agent 60b is adjusted by the desulfurization agent transfer unit 16.

The char 60a produced by the gasifying furnace 1 is received by the hopper 17a. In the case where a hopper 17c is under pressure, the char 60a is stored in the hopper 17a until the pressure in the hopper 17c is identical with that in the hopper 17a. After the hoppers 17a and 17c have the same pressure, a valve 17b is opened whereby the char 60a drops into a hopper 17e. Subsequently, the valve 17b is shut in such a manner that the hopper 17c is pressurized, as the result of which, when the pressure in the hopper 17c is identical with valve 17d is opened so that the char that in the hopper 17e, a valve 17d is opened so that the char 60a drops into the hopper 17e. The char 60a in the hopper 17e is supplied to the oxidizing furnace 4 through a rotary feeder 17f by a given quantity. The limestone containing CaS produced by the desulfurization furnace 2 is supplied to the oxidizing bed 4 by use of hoppers 17a', 17c' and 17e', valves 17b' and 17d', and a rotary feeder 17f', as in the case of the char 60a.

In the oxidizing furnace 4, a fluidized bed is mainly formed by a desulfurization agent. The char 60a and the particles restored by the desulfurization agent 60b and the cyclone 10b are supplied to the fluidized bed 4A through the char transfer unit 15c. The fluidized bed 4A is fluidized by the aid of the air 204 and a water vapor 300 supplied through the dispersion plate 41 from the bottom of the furnace.

In the fluidized bed 4A, the char is rapidly converted into the gas and ashes according to the combustion reaction whereas CaS in the limestone is slowly converted into $CASO_4$, as the result of which the fluidized particles of the fluidized bed 4A mainly contain the desulfurization agent.

A heat exchanger is located on a free board of the oxidizing furnace 4. The heat of the particles and the gas which are whirled up from the fluidized bed 4A is absorbed by the heat exchanger, whereby the temperature of the fluidized bed 4A is controlled in the range of 850° to 1050° C., which allows the reaction in which CaS is changed into $CaSO_4$ to occur, allows the reaction of $SO_2$ (produced by an auxiliary reaction) with CaO into $CaSO_4$ to progress, and prevents the ashes or the desulfurization agent from being softened to generate agrome.

The oxidizing furnace 4 is coupled to the cyclone 19b through two branches of piping, and one of the two branches extends from a position in the vicinity of the top of the oxidizing furnace 4, that is, the upper portion of the heat exchanger 10, and the other branch extends from a position which is at the same level as the lower portion of the heat exchanger 10. This is because the quantity of the combustion gas 700a which is transferred from the upper portion of the heat exchanger 10 to the cyclone 10b and the quantity of the combustion gas 700b which is transferred from the lower portion of the heat exchanger 10 to the cyclone 19b are adjusted by a valve 42 attached to one of these branches so that the temperature of the combustion gas 700 supplied to the gasifying furnace 1 is adjusted.

Ashes contained in the limestone and the limestone after desulfurization treatment are exhausted from the furnace bottom of the oxidizing furnace 4 as emission ashes 900, or from the lower portion of the cyclone 19b as emission ashes 901 toward the exterior of this power generator.

According to the present invention, with the above-mentioned structure, coal energy is effectively distributed to the gas turbine and the steam turbine, thereby enabling power generation with a high efficiency.

Further, coal gas produced by the gasifying furnace passes through the fluidized bed of the limestone according to the present invention, as the result of which the sum of the $H_2S$ density and the COS density in coal gas can be reduced to the chemical equilibrium represented by the following expression.

$$CaO+H_2S=CaS+H_2O$$

Figure 5:
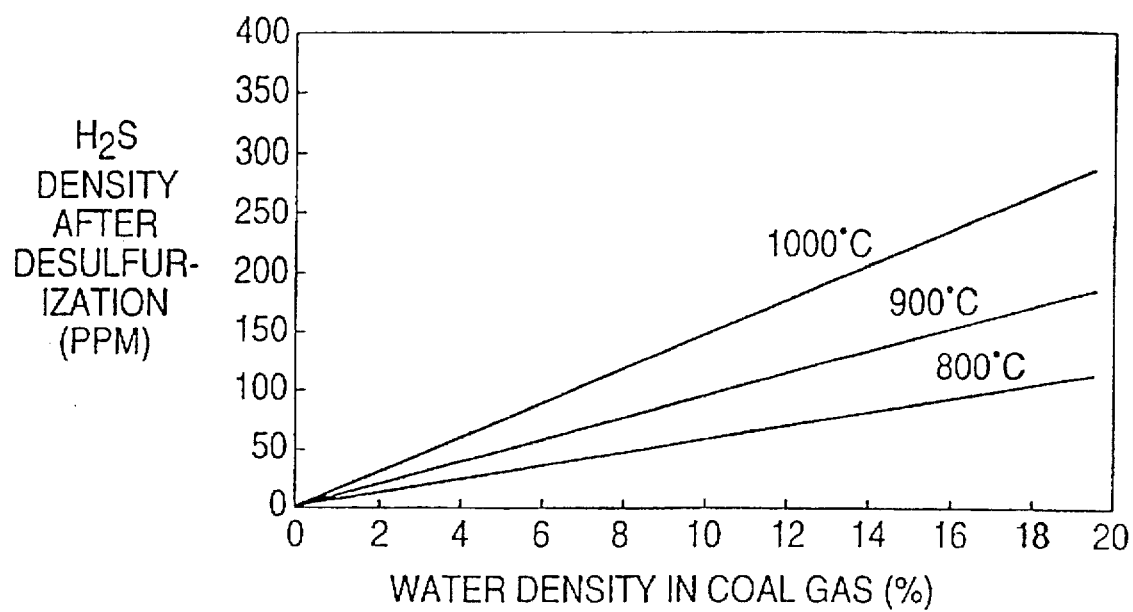
FIG. 5 is a diagram showing the density of water in gas and hydrogen sulfide after desulfurization.

The relationship between the chemical equilibrium density and the water vapor density of the above-mentioned $H_2S$ reaction is shown in FIG. 5.

According to the present invention, with the above structure, the $SO_2$ density produced by the oxidizing furnace can be restrained, and the quantity of SOx which is emitted from the system can be reduced due to the reduction effect of the $H_2S$ density of the above-mentioned coal gas.

Figure 6:
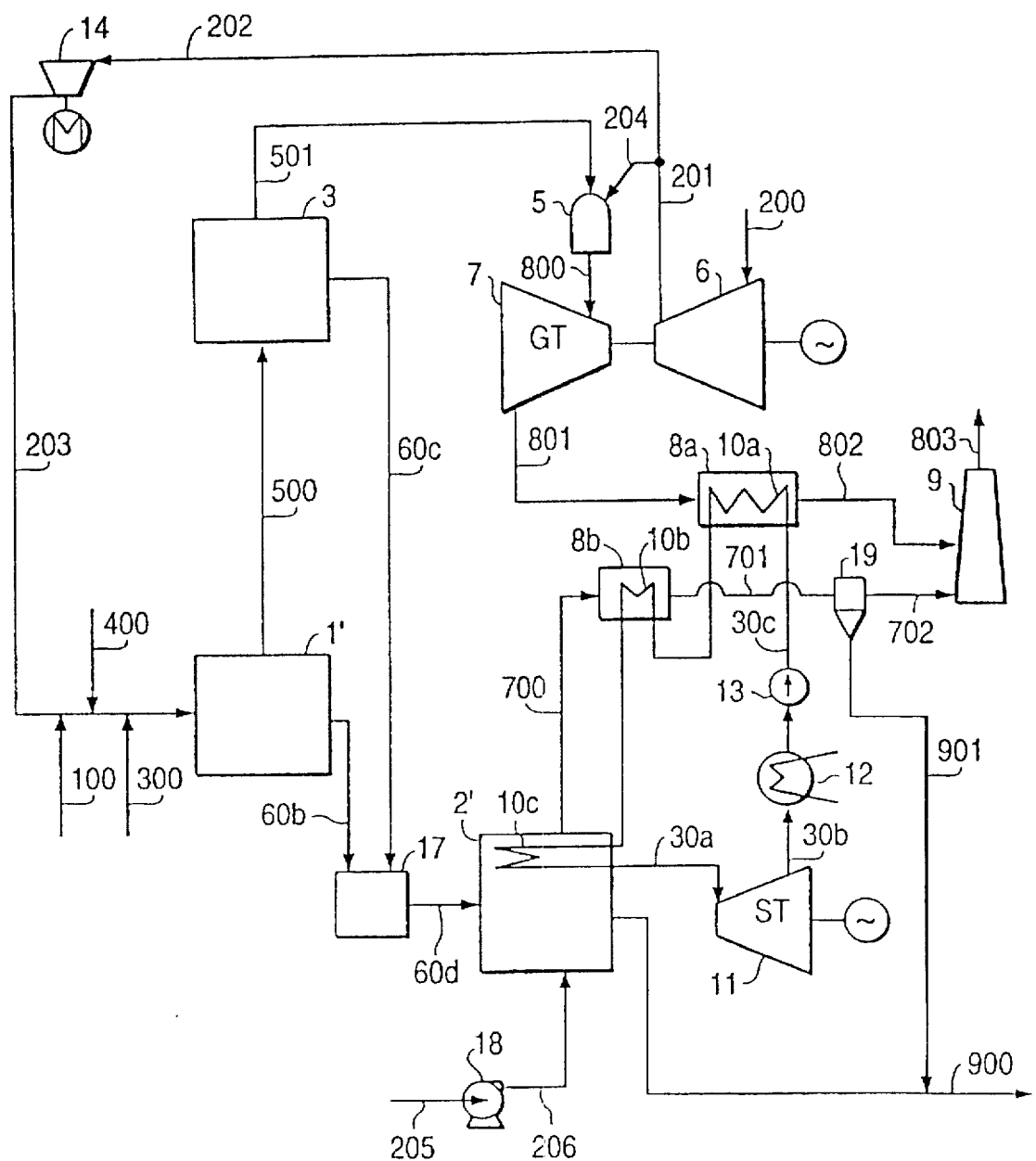
FIG. 6 is a system diagram of a conventional coal gasification power generator.
Figure 7:
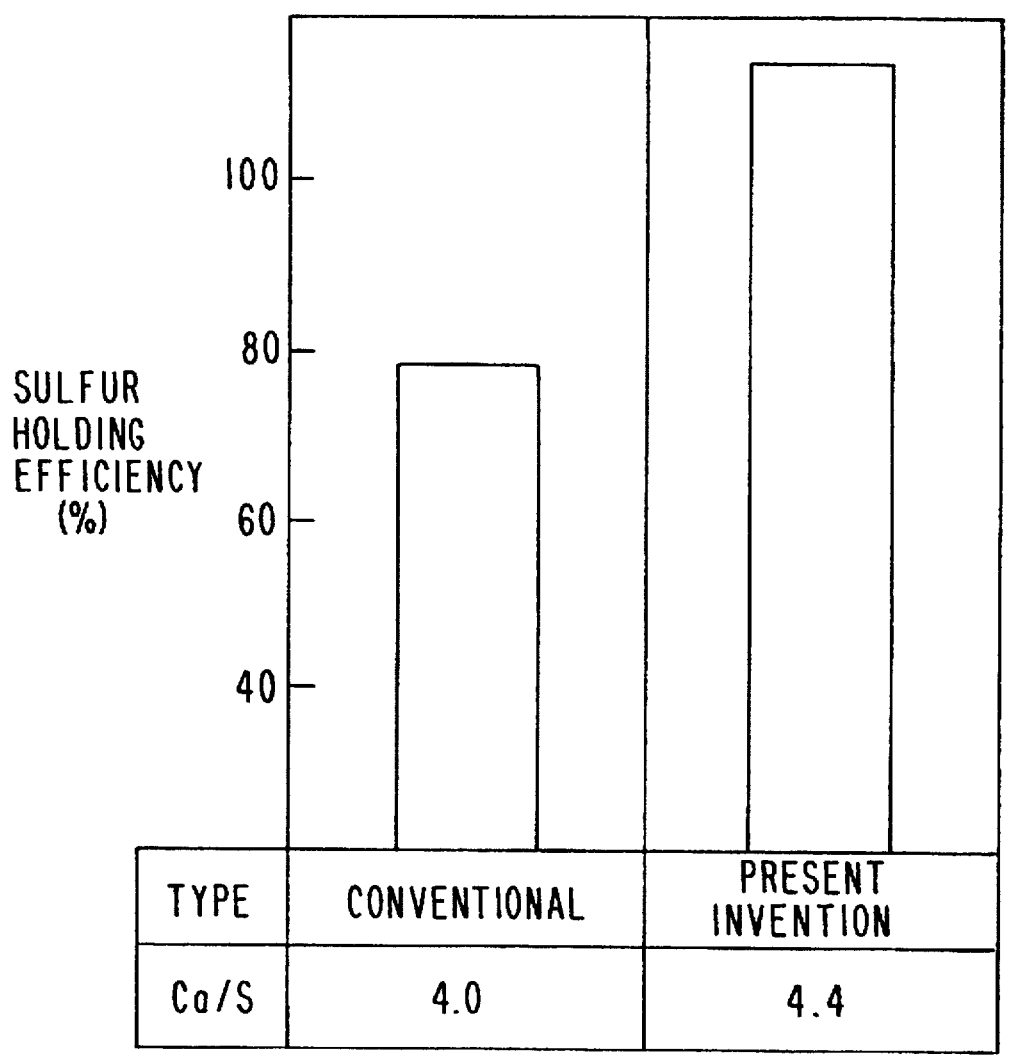
FIG. 7 is a chart comparing the performance of desulfurization between a mode employing a conventional integrated desulfurization gasifying furnace as shown in FIG. 6 and a preferred mode of the present invention.

FIG. 7 compares the performance of desulfurization between a mode employing a conventional integrated desulfurization gasifying furnace (reference character 1' in FIG. 6) and a preferred mode, as shown in this example, of this invention, which separates the gasifying furnace 1 from the desulfurization furnace 2. The term "sulfur holding efficiency" in this figure is defined as the percentage of sulfur being fixed in char or limestone to the quantity of sulfur initially contained in the coal. The term Ca/S is defined as the molar ratio of S in coal to Ca in limestone. As seen in the figure, the efficiency of desulfurization for the desulfurization separation type of this embodiment is superior to the conventional integrated desulfurization type by approximately 1:5 times.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed:

1. A coal gasification apparatus comprising:

a gasifying furnace (1) which receives coal (100) and oxidation gas (202, 202') and forms a fluidized bed with fluidized particles of said coal and char produced by said furnace (1) to convert said coal into gas (500) and char (60a);

a desulfurization furnace (2) which receives said coal gas (500) from said gasifying furnace (1) and which also receives limestone to fix and desulfurize a sulfur compound contained in said coal gas (500) as CaS in limestone (400) in a fluidized bed which is formed as particles for fluidization of said limestone (400); and an oxidizing furnace (4) which receives char (60a) from said gasifying furnace (1), limestone (60b) containing CaS from said desulfurization furnace (2) and oxidation gas (204, 204') to oxidize an unburned part of said char (60a) and to convert said CaS to $CaSO_4$, and includes a heat exchanger (10) for heating water or water vapor with reaction heat caused by these oxidation reactions to send out combustion gas (700), after undergoing heat exchange in said heat exchanger, to said gasifying furnace (1).

2. A coal gasification apparatus as claimed in claim 1, wherein said desulfurization furnace (2) comprises a gas dispersion plate (31) for forming the fluidized bed of said limestone (400), an interior dispersion plate (32) disposed in said fluidized bed for dividing said fluidized bed into an upper fluidized bed (2B) and a lower fluidized bed (2A), and a cooler (33) located in said upper fluidized bed (2B), wherein said lower fluidized bed (2A) allows coal gas supplied from said gasifying furnace (1) through said gas dispersion plate (31) to pass therethrough to keep said coal gas at 900° to 1100° C., and wherein said upper fluidized bed (2B) which receives said limestone (400) and which receives said coal gas from said lower fluidized bed (2A) through said interior dispersion plate (32) has said cooler (33) located therein to keep said coal gas at 800° to 950° C.

* * * * *